United States Patent [19]

Tabata et al.

[11]  4,365,022

[45]  Dec. 21, 1982

[54] METHOD FOR MANUFACTURE OF HIGH-STRENGTH SINTERED ARTICLE OF SUBSTANCES HAVING β-SILICON NITRIDE TYPE CRYSTAL STRUCTURE

[75] Inventors: Hideyo Tabata; Yoshitaka Kuwahara, both of Kasugai; Michihide Machida, Nagoya; Shyoichi Kume, Nagoya; Takeo Iga, Nagoya; Kazuo Saitoh, Nagoya; Shinji Tomura, Seto, all of Japan

[73] Assignees: Agency of Industrial Science & Technology; Ministry of International Trade & Industry, both of Tokyo, Japan

[21] Appl. No.: 317,542

[22] Filed: Nov. 2, 1981

[30] Foreign Application Priority Data

Dec. 6, 1980 [JP] Japan ............................ 55-172417
Dec. 6, 1980 [JP] Japan ............................ 55-172418

[51] Int. Cl.$^3$ .......................................... C04B 35/58
[52] U.S. Cl. ..................................... 501/97; 264/65; 501/98
[58] Field of Search ................... 501/97, 98; 264/65

[56] References Cited

U.S. PATENT DOCUMENTS

| 3,821,005 | 6/1974 | Layden | 501/97 |
| 4,119,689 | 10/1978 | Prochazka et al. | 501/97 |
| 4,134,947 | 1/1979 | Oda et al. | 501/97 |

FOREIGN PATENT DOCUMENTS

| 54-22419 | 2/1979 | Japan | 501/97 |
| 54-33511 | 3/1979 | Japan | 501/97 |
| 54-33512 | 3/1979 | Japan | 501/97 |

Primary Examiner—Mark Bell
Attorney, Agent, or Firm—Oblon, Fisher, Spivak, McClelland & Maier

[57] ABSTRACT

A high-strength sintered article of chemical substances having the β-silicon nitride type crystal structure is produced by blending 50 to 99.9 weight percent of a β-silicon nitride and/or β'-Sialon and 50 to 0.1 weight percent of a mixture, as a sintering aid, consisting of BeO, $Ga_2O_3$, and $Al_2O_3$ in respective amounts such as to have a $Ga_2O_3/BeO$ ratio in the range of from 2.8 to 9.4, an $Al_2O_3/BeO$ ratio in the range of from 0.0 to 2.6, and an $Al_2O_3/Ga_2O_3$ ratio in the range of from 0.0 to 1.1, all ratios being ratios by weight and sintering the resultant blend.

6 Claims, No Drawings

METHOD FOR MANUFACTURE OF HIGH-STRENGTH SINTERED ARTICLE OF SUBSTANCES HAVING β-SILICON NITRIDE TYPE CRYSTAL STRUCTURE

BACKGROUND OF THE INVENTION

This invention relates to a method for the manufacture of high-strength sintered articles composed preponderantly of silicon nitride or $\beta'$-Sialon which has the $\beta$-silicon nitride structure.

Sintered articles formed preponderantly of $Si_3N_4$ enjoy the properties of high thermal resistance, high strength, and a low thermal expansion coefficient. Owing to these properties, they have been drawing keen interest and have found utility in applications to automobile engine parts, gas turbine parts, cutting tools, etc. There are persistent efforts at adoption of compounds based on $Y_2O_3$-$Al_2O_3$, MgO, and $Al_2O_3$-MgO as sintering aids capable of enhancing strength and heightening density in the sintered articles of $Si_3N_4$. Unfortunately, incorporation of these sintering aids has failed to enhance the strength of the sintered articles sufficiently.

Sintered articles formed preponderantly of $\beta'$-Sialon exhibit advantageous properties such as high thermal resistance and ability to retain high mechanical strength, high wear resistance, high resistance to oxidation, and a low thermal expansion coefficient at elevated temperatures. Owing to these properties, they have been attracting deep interest and encouraging trial adoption of the sintered articles in ceramic parts for thermal engines such as automobile engines and gas turbines, in corrosion proof materials, and in refractories for molten metals.

By the term "$\beta'$-Sialon" used herein is meant a solid solution of oxynitride having an Si-Al-O-N based composition and possessing a three-dimensional network structure similar to the structure of $\beta$-$Si_3N_4$. This substance has a composition represented by the general formula, $Si_{6-z}Al_zO\,N_{8-z}$ (wherein, $0.0 \leq Z \leq 4.2$ is satisfied).

Heretofore, various methods have been proposed for the manufacture of sintered articles of $\beta'$-Sialon. These methods have been unable to produce sintered articles of $\beta'$-Sialon with high density, so that the products obtained thereby have failed to manifest the aforementioned merits of $\beta'$-Sialon to any appreciable extent.

An object of this invention is to provide a method for the manufacture of sintered articles of $\beta$-silicon nitride compositions which enjoy high strength and high density.

SUMMARY OF THE INVENTION

To accomplish the object described above according to the present invention, there is provided a method for the manufacture of high-strength sintered articles of $\beta$-silicon nitride compositions which comprises blending 50 to 99.9 weight percent of a $\beta$-silicon nitride composition, as a sintering matrix, and 50 to 0.1 wt % of a mixture, as a sintering aid, consisting of BeO, $Ga_2O_3$, and $Al_2O_3$ in amounts such as to have a $Ga_2O_3/BeO$ ratio in the range of from 2.8 to 9.4, an $Al_2O_3/BeO$ ratio in the range of from 0.0 to 2.6, and an $Al_2O_3/Ga_2O_3$ ratio in the range of from 0.0 to 1.1 by weight, molding the resultant blend in a given shape, and sintering the molded article at a temperature in the range of from 1300° to 1850° C.

DESCRIPTION OF THE PREFERRED EMBODIMENTS

The inventors continued a study with the aim of eliminating faults of $\beta$-silicon nitride compositions such as $\beta$-$Si_3N_4$ and $\beta'$-Sialon and producing sintered articles of such $\beta$-silicon nitride compositions possessed of improved strength and intimate, uniform texture. They have consequently discovered that this aim can be accomplished by incorporating into the compositions a specific amount of a two-component mixture of BeO and $Ga_2O_3$ or a three-component mixture of BeO, $Ga_2O_3$ and $Al_2O_3$ as a sintering aid. The present invention has been perfected on the basis of this discovery.

The $\beta$-silicon nitride compositions as referred to in the present invention are represented by $\beta'$-Sialon as well as $\beta$-$Si_3N_4$. They are compositions which have three-dimensional network structures similar to the structure of $\beta$-$Si_3N_4$.

First, the present invention will be described with reference to one embodiment thereof which involves use of $Si_3N_4$ as the major raw material. For this invention, it is essential that $Si_3N_4$ should account for a proportion of 50 to 99.9 wt % of all the inorganic raw materials to be used.

$Si_3N_4$ occurs in three types, i.e., $\alpha$ type, $\beta$ type, and amorphous type. For the purpose of this invention, any one of these three types or a combination of any two or all of these three types can be used. The proportion of the sintering aid to the whole of the raw materials to be used is required to fall in the range of from 0.1 to 50 wt %. If the proportion falls short of the lower limit of this range, the blend can be sintered only with difficulty. The amounts in which the components of the sintering aid, namely, BeO, $Ga_2O_3$, and $Al_2O_3$, are used are required to satisfy the following formulas of weight proportions.

$$Ga_2O_3/BeO = 2.8 \sim 9.4 \quad (1)$$

$$Al_2O_3/BeO = 0.0 \sim 2.6 \quad (2)$$

$$Al_2O_3/Ga_2O_3 = 0.0 \sim 1.1 \quad (3)$$

When the major raw material $Si_3N_4$ happens to contain $Al_2O_3$ or $Fe_2O_3$ as impurity or the blend to contain impurities which, on being exposed to the sintering conditions, give rise to $Al_2O_3$ or $Fe_2O_3$, the amount of $Al_2O_3$ corresponding to the combined amount of such impurities may be deducted from the aforementioned proportion of the sintering aid.

In the formula (1), the value of the ratio of $Ga_2O_3/BeO$ is desired to fall in the range of from 3.75 to 8.24. If the value falls in the preferred range of from 4.27 to 7.50, the sinterability of the blend is further improved and, consequently, the sintered article acquires enhanced strength.

In the formula (2), the value of the ratio of $Al_2O_3/BeO$ is desired to fall in the range of from 0 to 2.04. If the value falls in the preferred range of from 0.0 to 1.75, the sintered article acquires enhanced strength.

Preferably in the formula (3), the value of the ratio of $Al_2O_3/Ga_2O_3$ is desired to be in the range of from 0.0 to 0.41. If the value falls in this range, the produced sintered articles acquire the properties of high density and high strength.

Ga₂O₃ can be used in either of the two types, i.e., α type and β type. And Al₂O₃ can be used in α type, γ type, or any of the metastable types. Optionally, the oxides BeO, Ga₂O₃ and Al₂O₃ which are the components of the sintering aid may be used in the form of salts of berrylium, gallium, and aluminum which are converted into such oxides in the course of the sintering process. Use of these salts is also embraced in the scope of the present invention. Optionally, a double oxide solid solution obtained by the mutual reaction of BeO, Ga₂O₃, and Al₂O₃ may be used instead of using the three compounds as independent oxides.

The first step in the manufacture of a high-strength sintered article of silicon nitride contemplated by this invention from the raw materials described above consists in weighing out $Si_3N_4$ powder, BeO powder, $Ga_2O_3$ powder, and $Al_2O_3$ powder in amounts satisfying the prescribed percentage composition and blending the powders. Then, the resultant blend, with a binder incorporated therein as occasion demands, is molded by a press in a required shape to afford a molded artcle. As the binder, any of the binding agents generally adopted in the manufacture of sintered articles can be used. The amount of the binder has only to meet the requirement that it should enable the molded article produced by the press to retain its shape fast and intact.

The next step consists in sintering the molded article in air, in a weakly oxidative atmosphere such as of $CO_2$ gas, for example, or in a non-oxidative atmosphere such as of $N_2$ gas or Ar gas, for example, at a temperature in the range of from 1300° to 1850° C., preferably from 1400° to 1800° C., under application of pressure. This application of pressure to the sintering atmosphere is not necessarily required, however, when the proportion of the sintering aid as expressed by the formula,

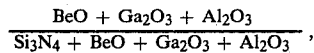

falls in the range of from 0.10 to 0.50. This is because the combined proportion of the component oxides in the sintering aid is large enough to accelerate the rate of sintering.

The sintering in the presence of pressure is generally carried out by hot pressing using a graphite die or in a hot isostatic press. Although application of the pressure on the order of 1 kg/cm² is already effective, the desirability of the results of the pressure application increases with the increasing magnitude of the pressure exerted. Generally, the pressure ranges from 100 to 400 kg/cm² in the case of the graphite die or from 1000 to 2000 kg/cm² in the case of the hot isostatic press.

The sintering performed as described above results in production of a novel sintered article containing oxynitride phase comprising $Si_3N_4$ and a $BeGa_2O_4$-$BeAl_2O_4$ solid solution having the beryllium gallate type crystal structure. This novel sintered article is composed substantially wholly of a crystalline phase consisting of $Si_3N_4$ which has been transformed to the β type and the aforementioned oxynitride solid solution phase. It contains virtually no glass phase.

In terms of strength at temperatures up to 1300° C., the novel high-strength sintered articles of silicon nitride manufactured by the method of this invention described above excels the conventional sintered article of silicon nitride. Thus, the sintered article is useful as a structural material for which stress concentration such as impact or fatigue poses a serious problem.

Now, the present invention will be described with reference to another embodiment thereof which involves use of β'-Sialon as the major raw material.

Various methods are available for the production of β'-Sialon. For example, a raw material composed preponderantly of β'-Sialon is obtained by selecting at least two members from among simple substances, oxides, nitrides, oxynitrides and complex oxides such as Si, $SiO_2$, $Si_3N_4$, $Si_2ON_2$, Al, $Al_2O_3$, AlN, and $3Al_2O_3 \cdot 2SiO_2$ which contain silicon or aluminum, blending them in amounts such that the ratio of the two component metal elements, aluminum and silicon (Al/Si), in terms of the number of atoms, will fall in the range of from 0.0 to 2.33, comminuting the blend, and heating the comminuted blend either in its unmodified form or in its molded form in an oxidative atmosphere containing nitrogen gas at a temperature in the range of from 1400° to 1700° C.

The sintering aid to be used in this case is composed of $Ga_2O_3$, BeO, and $Al_2O_3$ in the amounts satisfying the proportions of the aforementioned formulas (1), (2), and (3) similarly to the embodiment involving the use of $Si_3N_4$ as the major raw material. If β'-Sialon raw material happens to contain therein free $SiO_2$, it is desired to incorporate therein additionally an excess of BeO 0.8 to 0.85 times the weight of $SiO_2$. This is because these oxides react with each other to produce phenacite ($Be_2SiO_4$) and consequently eliminate the glass phase.

Then, the raw materials prepared as described above are blended similarly to the embodiment using $Si_3N_4$ as the major raw material and the resultant blend is molded into a required shape. Thereafter, the molded article of the blend is sintered in air, in an oxidative atmosphere, or in a non-oxidative atmosphere such as of $N_2$ gas or Ar gas, for example, at a temperature in the range of from 1300° to 1850° C., preferably from 1400° to 1800° C., with or without application of pressure. Presence or absence of the pressure application depends on the sintering conditions being involved. In case where the combined proportion of the added oxides to the silicon nitride powder exceeds 10%, the sintered article aimed at by this invention can be obtained without involving the pressure application in the sintering operation.

The sintering performed as described above results in production of a novel sintered article of β'-Sialon containing a multi-component oxynitride comprising β'-Sialon and a $BeGa_2O_4$-$BeAl_2O_4$ solid solution having the beryllium gallate type crystal structure.

The novel sintered article mentioned above has a crystalline phase formed substantially wholly of β'-Sialon and the aforementioned oxynitride solid solution phase. By proper adjustment of the composition and amount of the sintering aid to be used, the sintering can produce a sintered article of high density containing substantially no glass phase.

In terms of strength at temperature up to 1300° C., the novel high-strength sintered article of β'-Sialon manufactured by the method of this invention described above excels the conventional sintered article of β'-Sialon. Thus, the sintered article is useful as a structural material for which stress concentration such as impact or fatigue poses a serious problem, in refractory materials for molten metals, and in corrosionproof materals.

The method of the present invention has been described with reference to the embodiments using $Si_3N_4$ and β'-Sialon respectively as the major raw materials, to demonstrate the outstanding properties exhibited by the novel β-silicon nitride type sintered articles manufactured by the method.

Now, possible causes for the outstanding properties exhibited by the sintered articles manufactured by the method of this invention will be explored below.

Since the $BeGa_2O_4$-$BeAl_2O_4$ type complex oxide solid solution having the beryllium-gallate type crystal structure has similar crystal structure and lattice parameters to β-$Si_3N_4$ and β'-Sialon, it is believed that the solid solution in the course of the sintering process will readily react with $Si_3N_4$ and β'-Sialon to form an oxynitride solid solution and consequently give rise to a sintered article possessing uniform composition and uniform texture without forming any heterogeneous crystalline phase or glass phase between the particles.

The thermal expansion coefficient of the beryllium gallate type solid solution in the direction of the axis as well as the c axis has a value of about $3 \times 10^{-6}/°$ C., a level very close to the thermal expansion coefficient of the β type $Si_3N_4$ or β'-Sialon. Consequently, the thermal expansion coefficient of the whole sintered article including the grain boundary phase is fairly low and the resistance to thermal shock is high. Thus, the sintered article manufactured by this method is believed to exhibit high strength at elevated temperatures.

Further, the impurities such as $Al_2O_3$ and $Fe_2O_3$ which have caused degradation of the strength of the conventional sintered article are embraced into the beryllium gallate type $BeGa_2O_4$-$BeAl_2O_4$ solid solution to give rise to a sintered article of uniform texture. This formation of the uniform texture is believed to form one cause for the improvement of strength.

In the case of the sintered article manufactured from the blend including β'-Sialon, the unaltered $SiO_2$ which has produced a glass phase in the conventional sintered article and has constituted one cause for the degradation of strength at elevated temperatures reacts with BeO, one of the additive components, to form a $Be_2SiO_4$ crystalline phase similar in structure to β'-Sialon. The occurrence of this crystalline phase is believed to form one cause for the high strength maintained by the sintered article at elevated temperatures.

Now, the present invention will be described more specifically below with reference to working examples. This invention is not limited to these working examples but may be modified without departing from the spirit of this invention.

EXAMPLE 1

In a vibration mill using an alumina pot and alumina balls, 90 wt % of powdered silicon nitride having 99% purity and 0.7 μm of average particle diameter (median size) and consisting of 90% of α type and 10% of β type, 1.3 wt % of beryllium oxide having 99.9% purity, 7.8 wt % of gallium oxide having 99.99% purity, and 0.9 wt % of aluminum oxide having 99.9% purity were dry milled and blended for 100 hours. The resultant blend was molded in the shape of a disc 40 mm in diameter and about 10 mm in thickness. This disc was sintered in an atmosphere of nitrogen gas at a temperature of 1750° C. under pressure of 300 kg/cm² for 30 minutes. The sintered disc was cut into rectangular bars measuring 3×3×25 mm each. The bars were subjected to a bending test and an X-ray diffraction analysis. The bending strength determined by the bending test and the composition identified by the X-ray diffraction were as shown in Table 1.

EXAMPLE 2

With the same alumina pot and alumina balls as used in Example 1, 90 wt % of the same powdered silicon nitride, 1.5 wt % of the same beryllium oxide, 6.5 wt % of the same gallium oxide, and 20 wt % of the same aluminum oxide as used in Example 1 were wet milled with trichloro-trifluoroethane for 200 hours. The resultant powdered mixture was sintered under pressure under the same conditions as those of Example 1. The sintered product was subjected to the same bending test as in Example 1. The results were as shown in Table 1.

EXAMPLE 3

With the same alumina pot and alumina balls as used in Example 1, 95 wt % of powdered silicon nitride having 99.9% purity and 0.35 μm of average particle diameter and consisting of 85% of α type and 15% of β type, 0.9 wt % of the same beryllium oxide, and 4.1 wt % of the same gallium oxide as used in Example 1 were wet milled using ethanol as a medium with the use of a vibration mill for 200 hours. The comminuted blend was dried and molded similarly to Example 1. The molded blend was sintered in an atmosphere of argon gas at a temperature of 1700° C. under pressure of 200 kg/cm² for 30 minutes. The sintered disc was cut into rectangular bars of the same size as in Example 1. The bars were subjected to a bending test. The results were as shown in Table 1.

EXAMPLE 4

With the same alumina pot and alumina balls as used in Example 1, 94 wt % of powdered silicon nitride having 99.9 % purity and 3.5 μm of average particle diameter and consisting of 30% of α type and 70% of β type, 0.8 wt % of the same beryllium oxide, and 5.2 wt % of the same gallium oxide as used in Example 1 were dry milled for 100 hours. The resultant comminuted blend was molded in the shape of a disc having the same size as in Example 1. The disc was sintered in an atmosphere of nitrogen gas at a temperature of 1700° C. under pressure of 250 kg/cm² for 60 minutes. The sintered disc was cut into rectangular bars of the same size as in Example 1. The bars were subjected to a bending test and X-ray diffraction analysis. The bending strength and the composition consequently determined were as shown in Table 1.

COMPARATIVE EXPERIMENT 1

With the same alumina pot and alumina balls as used in Example 1, 90 wt % of the same powdered silicon nitride, 20 wt % of the same beryllium oxide, 1.0 wt % of the same gallium oxide, and 7.0 wt % of the same aluminum oxide as used in Example 1 were wet milled with trichloro-trifluoro-ethane for 20 hours. The resultant comminuted mixture was sintered under the same conditions as in Example 1. The sintered product was subjected to the same bending test as in Example 1. The results were as shown in Table 1.

TABLE 1

| | Density* (in %) | Bending strength at room temperature (kg/mm²) | Phases observed in the sintered articles | Initial composition of the additives | | |
|---|---|---|---|---|---|---|
| | | | | $\frac{Ga_2O_3}{BeO}$ | $\frac{Al_2O_3}{BeO}$ | $\frac{Al_2O_3}{Ga_2O_3}$ |
| Example | | | | | | |
| 1 | 99.8 | 110 | β-Si₃N₄, acid nitrides solid solution phase (BeGa₂O₄—BeAl₂O₄ and Si₃N₄) | 6.0 | 0.82 | 0.14 |
| 2 | 99.6 | 118 | β-Si₃N₄, acid nitrides solid solution phase (BeGa₂O₄—BeAl₂O₄ and Si₃N₄) | 4.33 | 1.72 | 0.40 |
| 3 | 99.5 | 112 | β-Si₃N₄, acid nitrides solid solution phase (BeGa₂O₄—BeAl₂O₄ and Si₃N₄) | 4.56 | 1.60 | 0.35 |
| 4 | 99.0 | 98 | β-Si₃N₄, acid nitrides solid solution phase (BeGa₂O₄—BeAl₂O₄ and Si₃N₄) | 6.5 | 0.54 | 0.08 |
| Comparative Experiment | | | | | | |
| 1 | 98.2 | 43 | β-Si₃N₄ + BeAl₂O₄ solid solution phase (chrysoberyl type) | 0.50 | 3.81 | 7.62 |

*The value given in this column represents the ratio, expressed in percentage, to the density calculated from the value of the theoretical density of β-Si₃N₄ and that of the theoretical density of the BeGa₂O₄—BeAl₂O₄ type solid solution phase.

It is seen from Table 1 that the products obtained in Examples 1–4 conforming to the present invention exhibited 98 to 118 kg/mm² of bending strength. One possible explanation for the very high levels of bending strength is that BeO, Ga₂O₃, and Al₂O₃ which were contained in the blend as additive components and Al₂O₃ which entered the blend in consequence of the attrition of the alumina pot and alumina balls during the comminution treatment reacted with one another in the course of the sintering process to produce in the grain boundary the BeGa₂O₄-BeAl₂O₄ solid solution phase having the same crystalline structure as β-Si₃N₄ and also produce the solid solution by a reaction between the solid solution phase and the β-Si₃N₄ particles and, consequently, bind the particles fast to one another. In the Comparative Experiment 1, because of the high proportion of Al₂O₃, the sintering treatment produced a solid solution having the olivine type crystal structure. Since this solid solution had a larger thermal expansion coefficient than silicon nitride. the sintered article produced fine cracks in the course of cooling and, consequently, suffered from low strength.

EXAMPLES 5–8 AND COMPARATIVE EXPERIMENTS 2–3

Sixty wt % of high-purity powdered quarts (average particle diameter not more than 0.6 μm) pulverized by a vibration mill and 40 wt % of atomized aluminum powder (particle size not more than 325 mesh) were dry blended. The blend thus obtained was molded in a rubber press to produce a cylindrical powder compact about 10 mm in diameter and about 100 mm in length. The cylindrical powder compact was heated in nitrogen gas of 1 atm. to 1450° C. and held at this temperature for 10 hours to undergo a nitriding reaction. The sintered bar was cooled to room temperature, then pulverized in a disc vibration mill. The pulverized product was mixed with trichloro-trifluoroethane and subjected to wet vibration milling using an alumina pot and alumina balls for 200 hours.

The resultant powder was dried in a drier and then classified with an ultrasonic micro-sieve to obtain a powder formed preponderantly of β'-Sialon and having particle diameters of not more than 5 μm (average particle diameter 0.5 μm).

By the X-ray diffraction analysis, this powder was found to contain α-Al₂O₃ and an unknown crystalline phase in very small amounts and the remainder of the powder was composed substantially wholly of β'-Sialon.

The preponderantly β'-Sialon powder thus prepared was mixed with beryllium oxide having 99.9% purity, gallium oxide having 99.99% purity, and aluminum oxide having 99.9% purity in the amounts indicated in Table 2 to produce a total of six powdered blends. The blends except for the blend of Comparative Experiment 2 were each wet milled in the presence of trichloro-trifluoro-ethane added thereto for 6 hours by use of an alumina pot and alumina balls.

Then, each blended powder consequently obtained was dried and then molded in the shape of a disc 40 mm in diameter and about 10 mm in thickness in a metal press under pressure of 500 kg/cm². The molded product was set in position within a graphite die coated with BN and sintered under pressure of 300 kg/cm² for 30 minutes at the temperature indicated in Table 2. The density of the resultant sintered article was measured. It was then cut into rectangular bars each measuring 3×3×25 mm. The rectangular bars were subjected to a bending test at room temperature. The sinterd articles were also subjected to X-ray diffraction analysis for determination of composition. The results are shown in Table 2.

which, on being burned, acquires the structure of β-silicon nitride composition with 50 to 0.1 wt % of a mixture, as a sintering aid, consisting of BeO, $Ga_2O_3$, and $Al_2O_3$ of respective amounts such as to have a $Ga_2O_3$/BeO ratio in the range of from 2.8 to 9.4, an $Al_2O_3$/BeO ratio in the range of from 0.0 to 2.6, and an $Al_2O_3$/$Ga_2O_3$ ratio in the range of from 0.0 to 1.1, all

TABLE 2

| Example | Composition of raw material (by weight %) | | | | Sintering temperature (°C.) | Density* | Bending strength at room temperature $(kg/mm^2)$ | Composition of sintered product | | | |
|---|---|---|---|---|---|---|---|---|---|---|---|
| | Sialon | BeO | $Ga_2O_3$ | $Al_2O_3$ | | | | Composition | $\frac{Ga_2O_3}{BeO}$ | $\frac{Al_2O_3}{BeO}$ | $\frac{Al_2O_3}{Ga_2O_3}$ |
| Example 5 | 98 | 0.4 | 1.6 | — | 1750 | 98.8 | 49 | β'-Sialon, Acid nitride solid solution phase ($BeGa_2O_4$—$BeAl_2O_4$ and β'-Sialon) | 4 | 1.60 | 0.40 |
| Example 6 | 95 | 0.8 | 3.6 | 0.6 | 1700 | 99.2 | 57 | β'-Sialon, Acid nitride solid solution phase ($BeGa_2O_4$—$BeAl_2O_4$ and β'-Sialon) | 4.5 | 1.50 | 0.33 |
| Example 7 | 90 | 1.5 | 6.5 | 2.0 | 1650 | 99.0 | 54 | β'Sialon, Acid nitride solid solution phase ($BeGa_2O_4$—$BeAl_2O_4$ and β'-Sialon) | 5 | 1.72 | 0.40 |
| Example 8 | 85 | 2.2 | 9.6 | 2.2 | 1600 | 98.9 | 52 | β'-Sialon, Acid nitride solid solution phase ($BeGa_2O_4$—$BeAl_2O_4$ and β'-Sialon) | 4.36 | 1.70 | 0.39 |
| Comparative Experiment 2 | 100 | — | — | — | 1750 | 96.5 | 28 | β'-Sialon + $α$-$Al_2O_3$ | — | — | — |
| Comparative Experiment 3 | 90 | 1.0 | 2.0 | 7.0 | 1700 | 97.3 | 30 | β'-Sialon + $BeGa_2O_4$ + $α$-$Al_2O_3$ + $BeAl_2O_4$ | 2 | 7.58 | 3.79 |

*The value given in this column represents the ratio, expressed in percentage, to the density calculated from the value of the theoretical density of β'-Sialon and that of the theoretical density of the $BeGa_2O_4$—$BeAl_2O_4$ type solid solution phase.

It is seen from Table 2 that the products of Examples 5-8 in conformity with the present invention exhibited decisively higher levels of bending strength than the products of Comparative Experiments 2-3. One explanation for these very high levels of bending strength is that BeO, $Ga_2O_3$, and $Al_2O_3$ which were incorporated in the blend as additive components and $Al_2O_3$ and $Fe_2O_3$ which entered the blend in the course of the pulverizing treatment reacted with one another in the course of the sintering treatment to promote the sintering reaction and, at the same time, form in the grain boundary a beryllium-gallate type solid solution phase having a crystalline structure similar to β'-Sialon and also produce a solid solution by a reaction between the solid solution phase mentioned above and the grains of β'-Sialon so as to bind the particles fast to one another.

In contrast, the product of Comparative Experiment 2 did not contain any additive component. Consequently, it acquired a lower density and exhibited a lower bending strength than the product containing such additive components. In the case of the product of Comparative Experiment 3, one possible explanation for the poor results is that since $Al_2O_3$ incorporated in the blend as an additive component is present far in excess of the allowable limit, $α$-$Al_2O_3$, $BeAl_2O_4$, etc. are distributed in the grain boundary and bring about adverse effects upon the strong union between the β'-Sialon particles.

What is claimed is:

1. A method for the manufacture of a high-strength sintered article of β-silicon nitride composition, which comprises blending 50 to 99.9 wt. % of a composition ratios being ratios by weight, molding the resultant blend, and sintering the molded blend at a temperature in the range of from 1300° to 1850° C.

2. The method according to claim 1, wherein the composition which, on being burned, acquires the structure of β-silicon nitride is $Si_3N_4$.

3. The method according to claim 2, wherein the sintering is carried out in one atmosphere selected from the group consisting of air, a weakly oxidative atmosphere, and a non-oxidative atmosphere.

4. The method according to claim 2, wherein $Si_3N_4$ contains as impurity at least one oxide selected from the group consisting of $Al_2O_3$ and $Fe_2O_3$ and/or at least one compound selected from the group consisting of the compounds which, on being burned, produce $Al_2O_3$ and $Fe_2O_3$ and the sintering aid contains the corresponding components in amounts less the amounts of said oxides contained in $Si_3N_4$.

5. The method according to claim 1, wherein the composition which, on being burned, acquires the structure of β-silicon nitride is β'-Sialon represented by the general formula, $Si_{6-z}Al_zO_zN_{8-z}$, wherein $0.0 \leq Z \leq 4.2$ is satisfied.

6. The method according to claim 5, wherein β'-Sialon contains as impurity at least one oxide selected from the group consisting of $Al_2O_3$ and $Fe_2O_3$ and/or at least one compound selected from the group consisting of the compounds which, on being burned, produce $Al_2O_3$ and $Fe_2O_3$ and the sintering aid contains the corresponding components in amounts less the amounts of said oxides contained in β'-Sialon.

* * * * *